(12) United States Patent
DiFoggio et al.

(10) Patent No.: US 9,404,360 B2
(45) Date of Patent: Aug. 2, 2016

(54) FIBER OPTIC SENSOR SYSTEM USING WHITE LIGHT INTERFEROMETRY

(75) Inventors: Rocco DiFoggio, Houston, TX (US); Sebastian Csutak, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 282 days.

(21) Appl. No.: 12/368,576

(22) Filed: Feb. 10, 2009

(65) Prior Publication Data

US 2009/0199630 A1  Aug. 13, 2009

Related U.S. Application Data

(60) Provisional application No. 61/028,119, filed on Feb. 12, 2008.

(51) Int. Cl.
| | |
|---|---|
| *G01B 9/02* | (2006.01) |
| *E21B 47/12* | (2012.01) |
| *G01V 1/22* | (2006.01) |
| *G01V 3/30* | (2006.01) |

(52) U.S. Cl.
CPC .............. *E21B 47/123* (2013.01); *G01V 1/226* (2013.01); *G01V 3/30* (2013.01)

(58) Field of Classification Search
USPC ..................... 356/241.1, 241.4, 477, 480, 481
See application file for complete search history.

(56) References Cited

U.S. PATENT DOCUMENTS

| | | | |
|---|---|---|---|
| 4,712,916 A * | 12/1987 | Gunn ........................ | 356/241.1 |
| 5,202,939 A | 4/1993 | Belleville et al. | |
| 5,301,001 A * | 4/1994 | Murphy et al. .............. | 356/35.5 |
| 5,303,775 A | 4/1994 | Michaels et al. | |
| 5,392,117 A | 2/1995 | Belleville et al. | |
| 5,570,437 A * | 10/1996 | Kluth et al. ..................... | 385/12 |
| 5,617,927 A | 4/1997 | Maissa | |
| 5,675,674 A * | 10/1997 | Weis ............................... | 385/12 |
| 5,870,511 A * | 2/1999 | Sawatari et al. ................ | 385/12 |
| 5,872,876 A * | 2/1999 | Kluth et al. ..................... | 385/12 |
| 5,892,860 A * | 4/1999 | Maron et al. ................... | 385/12 |
| 5,939,717 A * | 8/1999 | Mullins ........................ | 250/255 |
| 6,009,216 A * | 12/1999 | Pruett et al. .................... | 385/12 |
| 6,045,502 A * | 4/2000 | Eppstein et al. ............. | 600/306 |
| 6,072,922 A * | 6/2000 | Albin et al. ..................... | 385/12 |
| 6,075,611 A * | 6/2000 | Dussan et al. ................ | 356/432 |
| 6,078,706 A * | 6/2000 | Nau et al. ........................ | 385/12 |
| 6,176,323 B1 * | 1/2001 | Weirich et al. ................. | 175/40 |

(Continued)

OTHER PUBLICATIONS

James C. Wyant. "White Light Interferometry". Apr. 1-5, 2002. Gaylord Palms Resort and Convention Center, Orlando FL. http://www.optics.arizona.edu/jcwyant/meeting_papers.htm.

*Primary Examiner* — Jonathan Hansen
(74) *Attorney, Agent, or Firm* — Cantor Colburn LLP (57) ABSTRACT

A downhole fiber optic apparatus for acquiring downhole information includes a carrier conveyable in a borehole, an electromagnetic energy emitter coupled to the carrier, and a fiber optic sensor that receives electromagnetic energy emitted from the electromagnetic energy emitter and generates an optical output signal representative of the downhole information. A method for acquiring downhole information includes conveying a carrier in a borehole, emitting electromagnetic energy from an electromagnetic energy emitter coupled to the carrier, receiving electromagnetic energy emitted from the electromagnetic energy emitter with a fiber optic sensor, and generating an optical signal representative of the downhole information using the fiber optic sensor.

18 Claims, 6 Drawing Sheets

(56) References Cited

U.S. PATENT DOCUMENTS

| | | | |
|---|---|---|---|
| 6,442,304 B1 * | 8/2002 | Crawley et al. | 385/12 |
| 6,502,456 B1 * | 1/2003 | Chen | 73/152.46 |
| 6,683,681 B2 | 1/2004 | DiFoggio et al. | |
| 6,704,109 B2 * | 3/2004 | Wu et al. | 356/417 |
| 6,842,254 B2 | 1/2005 | Van Neste et al. | |
| 6,978,832 B2 * | 12/2005 | Gardner et al. | 166/250.1 |
| 7,043,102 B2 * | 5/2006 | Okamoto et al. | 385/12 |
| 7,355,715 B2 * | 4/2008 | Suzuki et al. | 356/478 |
| 7,437,027 B2 * | 10/2008 | Zerwekh et al. | 385/12 |
| 7,447,390 B2 * | 11/2008 | Dunphy et al. | 385/12 |
| 7,684,657 B2 * | 3/2010 | Donlagic et al. | 385/12 |
| 7,819,877 B2 * | 10/2010 | Guzman et al. | 606/86 B |
| 7,937,223 B2 * | 5/2011 | Ciglenec et al. | 702/12 |
| 2002/0118905 A1 * | 8/2002 | Wu et al. | 385/12 |
| 2004/0047535 A1 * | 3/2004 | Ukrainczyk | 385/12 |
| 2005/0099618 A1 * | 5/2005 | DiFoggio et al. | 356/70 |
| 2006/0115204 A1 * | 6/2006 | Marsh et al. | 385/12 |
| 2006/0153487 A1 * | 7/2006 | McLellan et al. | 385/12 |
| 2007/0045000 A1 | 3/2007 | Lin et al. | |

\* cited by examiner

FIBER OPTIC SENSOR SYSTEM USING WHITE LIGHT INTERFEROMETRY

CROSS REFERENCE TO RELATED APPLICATIONS

Under 35 U.S.C. §119(e), this application claims the benefit of U.S. Provisional Application No. 61/028,119, filed Feb. 12, 2008, the entire disclosure of which is incorporated herein by reference.

BACKGROUND OF THE INVENTION

1. Field of the Invention

The present disclosure generally relates to reservoir sampling and testing and in particular to methods and apparatus for estimating properties of downhole fluids.

2. Description of the Related Art

Oil and gas wells have been drilled at depths ranging from a few thousand feet to as deep as five miles. A large portion of the current drilling activity involves directional drilling that includes drilling boreholes deviated from vertical by a few degrees to horizontal boreholes, to increase the hydrocarbon production from earth formations.

Information about the subterranean formations traversed by the borehole may be obtained by any number of techniques. Techniques used to obtain formation information include obtaining one or more core samples of the subterranean formations and obtaining fluid samples produced from the subterranean formations these samplings are collectively referred to herein as formation sampling.

Exploration, drilling and production operations are facilitated by gathering various types of downhole information relating to the operation of a drill string, wireline or slick line within a borehole; relating to components of downhole tools; relating to downhole fluids including drilling fluid, return fluid and formation fluid; and/or relating to formation samples, formation fluid within the formation and the formation structure.

Some such operations for collecting information downhole make use of optical sensors. Unfortunately, such sensors typically include fragile components and may not perform well in a downhole environment. Examples include various embodiments of interferometers.

In some embodiments of interferometers for downhole measurements, aspects such as a light source, interferometer, and associated photodetectors are maintained topside (above ground) in order to avoid the detrimental performance realized downhole, which leaves only the fiber cable and fiber optic sensor downhole. Of course, it is easily recognized that having an instrument with various components downhole and others topside presents many limitations including requiring a fiber optic cable from the surface to downhole, which is not practical while a drill string is drilling in the well. Having far separated components affects the versatility of drilling or logging equipment downhole.

Accordingly, what are needed are methods and apparatus for providing a robust interferometer downhole. Preferably, the apparatus are compact and physically robust, such that limitations are not imposed on other uses of downhole tooling and reliable data can be collected.

SUMMARY OF THE INVENTION

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

In one embodiment, the invention includes a downhole fiber optic apparatus for acquiring downhole information including: a carrier conveyable in a borehole; an electromagnetic energy emitter coupled to the carrier; and a fiber optic sensor that receives electromagnetic energy emitted from the electromagnetic energy emitter and generates an optical output signal representative of the downhole information.

In another embodiment, the invention includes a method for acquiring downhole information including: conveying a carrier in a borehole; emitting electromagnetic energy from an electromagnetic energy emitter coupled to the carrier; receiving electromagnetic energy emitted from the electromagnetic energy emitter with a fiber optic sensor; and generating an optical signal representative of the downhole information using the fiber optic sensor.

In a further embodiment, the invention includes a method for evaluating a sample downhole, the method including: conveying a carrier into a borehole; the carrier including an electromagnetic energy emitter coupled to the carrier and a fiber optic sensor that receives electromagnetic energy emitted from the electromagnetic energy emitter and generates an optical output signal representative of the downhole information; and evaluating the sample with the sensor.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DETAILED DESCRIPTION OF THE INVENTION

Disclosed are methods and apparatus for performing fiber optic sensor measurements in a downhole environment with a downhole interferometer that makes use of white light. The methods and apparatus provide various advantages over the prior art. In one example, an integrated interferometry unit is included within a downhole instrument, and provides for an integrated unit that produces more rapid measurements than previously achievable. Further, by providing compact analysis capabilities, downhole tooling may include additional components, such as for other types of concurrent analyses. Another distinct advantage is that of a mechanically robust interferometry system, that results in reduced maintenance and replacement costs.

The ability to place a fiber optic sensor system that includes a light source, interferometer, detection electronics, and fiber sensors downhole improves downhole operations, can be relied upon to reduce tool size and provide for a more robust sensing system. Fiber optic sensors described herein are small and lightweight, which helps when space is at a premium, such as in tooling for performing measurement-while-drilling (MWD). Further, the lightweight and compact aspects improve resistance to vibration and shock. In addition, the fiber optic sensors of the present disclosure are resistant to chemicals commonly encountered in the downhole environment. Importantly, disposing system components downhole, for example, a fiber sensor, a light source, and related interrogation hardware including interferometer, eliminates the need for having an optical fiber running from the surface to downhole. This provides users with opportunities to make use of fiber optic sensor techniques described herein, while operating drilling systems having fewer limitations.

Figure 1:
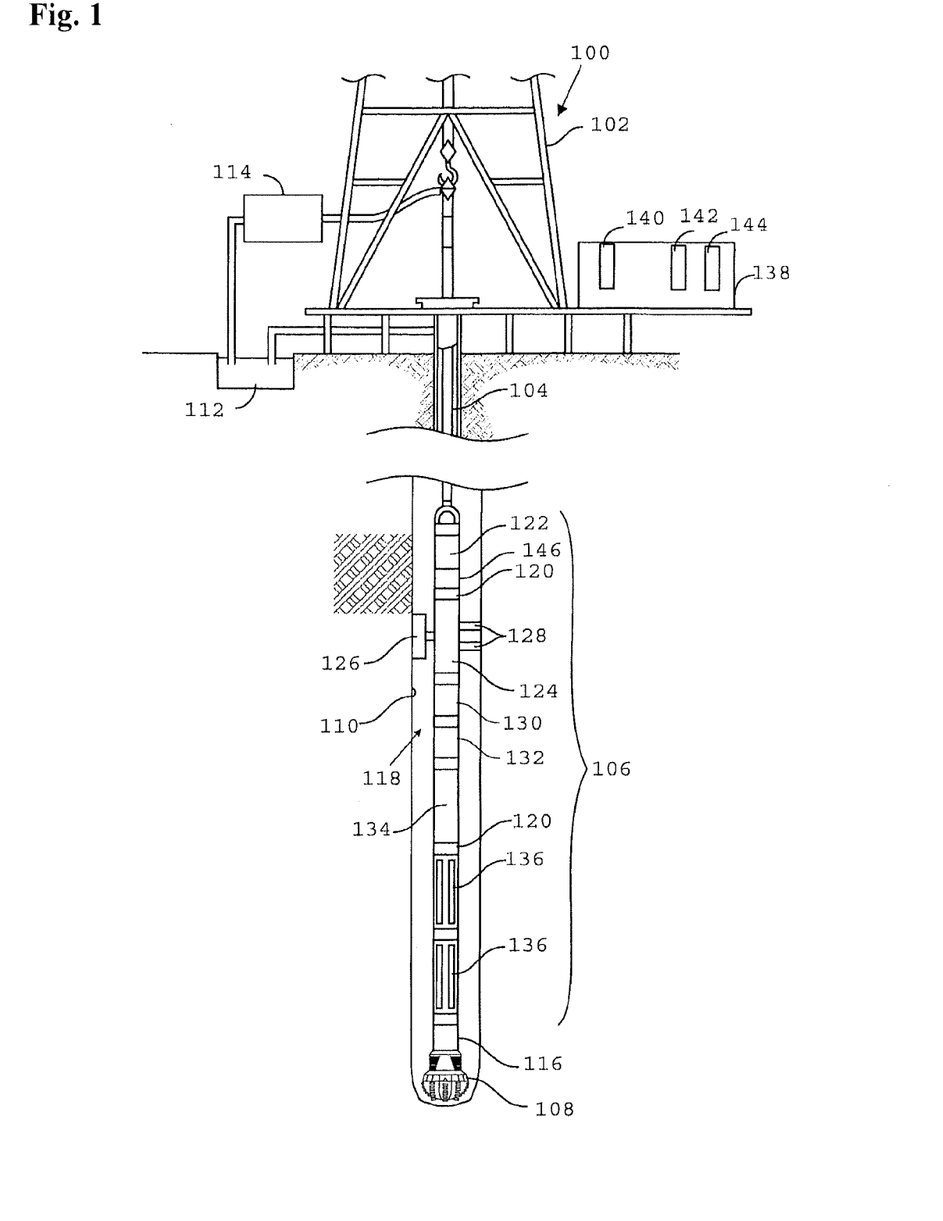
FIG. 1 illustrates a non-limiting example of a drilling system in a measurement-while-drilling (MWD) arrangement according to several non-limiting embodiments of the disclosure.

FIG. 1 schematically illustrates a non-limiting example of a drilling system 100 in a measurement-while-drilling (MWD) arrangement. In this example, a derrick 102 supports a drill string 104, which may be a coiled tube or drill pipe. The drill string 104 may carry a bottom hole assembly (BHA) referred to as a downhole sub 106 and a drill bit 108 at a distal end of the drill string 104 for drilling a borehole 110 through earth formations. The exemplary drill string 104 operates as a carrier, but any carrier is considered within the scope of the disclosure. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof Other carrier examples include casing pipes, wirelines, wireline sondes, slickline sondes, downhole subs, BHA's, drill string inserts, modules, internal housings and substrate portions thereof Drilling operations according to several embodiments may include pumping drilling fluid or "mud" from a mud pit 112, and using a circulation system 114, circulating the mud through an inner bore of the drill string 104. The mud exits the drill string 104 at the drill bit 108 and returns to the surface through an annular space between the drill string 104 and inner wall of the borehole 110. The drilling fluid is designed to provide a hydrostatic pressure that is greater than the formation pressure to avoid blowouts. The pressurized drilling fluid may further be used to drive a drilling motor 116 and may be used to provide lubrication to various elements of the drill string 104.

In the non-limiting embodiment of FIG. 1, the downhole sub 106 includes a formation evaluation tool 118. The formation evaluation tool 118 may include an assembly of several tool segments that are joined end-to-end by threaded sleeves or mutual compression unions 120. An assembly of tool segments suitable for the present disclosure may include a power unit 122 that may include one or more of a hydraulic power unit, an electrical power unit and an electro-mechanical power unit. In the example shown, a formation evaluation tool 124 is coupled to the downhole evaluation tool 120 below the power unit 122. The exemplary formation sample tool 124 shown comprises an extendable probe 126 that may be opposed by bore wall feet 128. Both, the extendable probe 126 and the opposing feet 128 may be hydraulically and/or electro-mechanically extendable to firmly engage the well borehole wall. The formation evaluation tool 124 may be configured for acquiring and/or extracting a formation core sample, a formation fluid sample, formation images, nuclear information, electromagnetic information, and/or other downhole samples.

Continuing now with FIG. 1, several non-limiting embodiments may be configured with the formation evaluation tool 124 operable as a fluid sampling tool. In these embodiments, a large displacement volume motor/pump unit 130 may be provided below the formation evaluation tool 128 for line purging. A similar motor/pump unit 132 having a smaller displacement volume may be included in the tool in a suitable location, such as below the large volume pump, for quantitatively monitoring fluid received by the downhole evaluation tool 118 via the formation evaluation tool 124. As noted above, the formation sampling tool 124 may be configured for any number of formation sampling operations. Construction and operational details of a suitable non-limiting fluid evaluation tool 124 for extracting fluids are more described by U.S. Pat. No. 5,303,775, the specification of which is incorporated herein by reference. Suitable coring tools for use as a formation evaluation tool 124 may be substantially as described in U.S. Pat. No. 5,617,927 for "Sidewall Rotary Coring Tool" and in published U.S. patent application Ser. No. 11/215,271 having the publication number US 2007/0045005 A2 for "Rotary Coring Device and Method for Acquiring a Sidewall Core From an Earth Formation," which patent and published application are assigned to the assignee of the present application, and which patent and published application are hereby incorporated herein by reference.

In several embodiments to be described in further detail later, the downhole evaluation tool 118 may include a downhole fiber optic evaluation system 134 for evaluating several aspects of the downhole sub 106, the drilling system 100, aspects of the downhole fluid in and/or around the downhole sub 106, formation samples received by the downhole sub 106, and of the surrounding formation. Several non-limiting examples of the fiber optic sensor system 134 will be described in more detail later.

One or more formation sample containers 136 may be included below the fluid pumps 130, 132 for retaining formation samples received by the downhole sub 106. In several examples, the formation sample containers 136 are individually or collectively detachable from the downhole evaluation tool 118.

A downhole transceiver 146 may be coupled to the downhole sub 106 for bidirectional communication with a surface transceiver 140. The surface transceiver 140 communicates received information to a controller 138 that includes a memory 142 for storing the information and a processor 144 for processing the information. The memory 142 may also have stored thereon programmed instructions that when executed by the processor 144 carry out one or more operations and methods that will become apparent in view of the discussion to follow. The memory 142 and processor 144 may be located downhole on the downhole sub 106 in several non-limiting embodiments.

Figure 2:
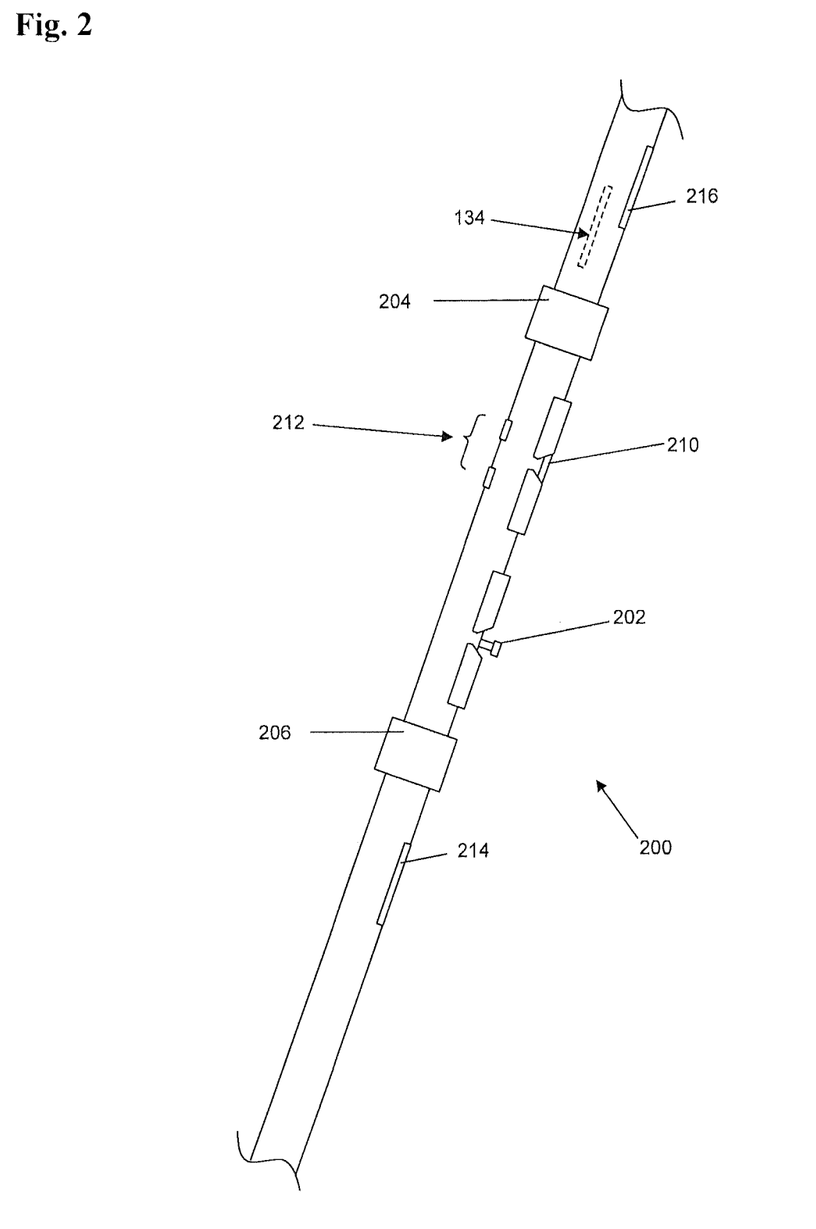
FIG. 2 is a non-limiting example of a downhole sub according to one or more embodiments that may be used in an MWD arrangement, such as the MWD arrangement shown in FIG. 1.

Referring now to FIG. 2, an exemplary downhole sub 200 according to one or more embodiments may be used in an MWD arrangement, such as the downhole sub 106 described above and shown in FIG. 1. In one or more embodiments, the downhole sub 200 may be configured for wireline and/or slickline arrangements without departing from the scope of the disclosure. The exemplary downhole sub 200 may include an optional pair of straddle packers that include an upper packer 204 and a lower packer 206. In several non-limiting embodiments, the packers 204, 206 selectively expand to contact a borehole wall to isolate an annular section of the borehole between the packers. The packers 204, 206 may be actuated by any number of actuating mechanisms. The packers may be actuated using pressurized hydraulic fluid. In other embodiments, the packers may be mechanically compressed or actuated using hydraulically actuated pistons or the like. When actuated, each packer 204, 206 seals an adjacent borehole wall area to form a fluid barrier across a portion of the borehole. In one example, the packers include flexible bladders that can deform sufficiently to maintain a sealing engagement with the formation even though the downhole sub 200 may not be centrally positioned in the borehole.

A formation evaluation tool 202 may be disposed between the upper packer 204 and the lower packer 206. The formation evaluation tool 202 may be substantially similar to the formation evaluation tool 124 described above and shown in FIG. 1. Additional formation evaluation tools 210, 212 may be included in several non-limiting embodiments without departing from the scope of the disclosure. The several formation evaluation tools may be used to gather formation information of different types. For example, the formation evaluation tools 202, 210, 212 may be used to gather information relating to pressure, temperature, location, movement, formation core samples, formation fluid samples, formation images, nuclear information, electromagnetic information, and/or other downhole information.

One or more formation sample containers 214 may be included with the downhole sub 200 shown in this example below the lower packer 206 to receive formation samples. The sample containers 214 need not be located as shown. The sample containers 214 may be located at any suitable location along the downhole sub 200, along a drill string, along a wireline sonde, and/or along a slickline sonde. The formation sample containers 214 may be substantially similar to the formation sample containers 136 described above and shown in FIG. 1. Decentralizing members 216 may be used to move the downhole sub 200 toward the borehole wall when proximity or contact is desirable. In one or more embodiments, one or more feet as described above and shown in FIG. 1 at 128 may be used as decentralizing members 216.

As noted above and shown in FIG. 1, one or more embodiments may include a downhole fiber optic evaluation system 134 shown in the example of FIG. 2 above the upper packer 204. The downhole fiber optic evaluation system 134 may be located anywhere along the downhole sub 200, or as noted above with reference to FIG. 1 anywhere along the downhole sub carrier 104.

Figure 3:
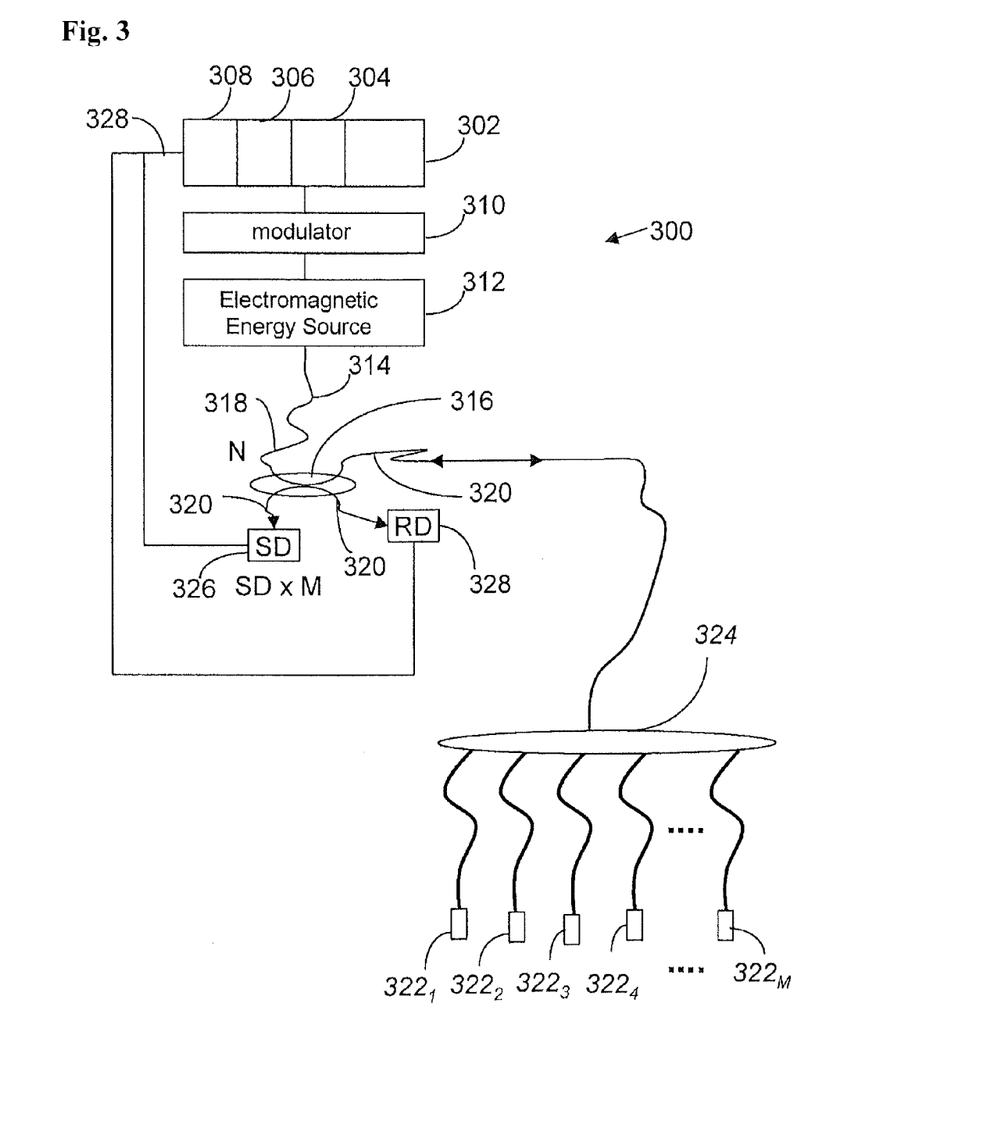
FIG. 3 illustrates a non-limiting schematic of a downhole fiber optic evaluation system.

FIG. 3 illustrates a non-limiting schematic of a downhole fiber optic evaluation system 300. The downhole fiber optic evaluation system 300 may be included as part of a downhole sub such as the downhole sub 200 described above and shown in FIG. 2. The downhole fiber optic evaluation system 300 may be included as part of an MWD downhole sub 106 as described above and shown in FIG. 1 or using other carriers such as wireline or slickline.

The non-limiting downhole fiber optic evaluation system 300 in the example shown includes a controller that includes a transceiver 302, a processor 304, a memory 306 and a controller interface 308. The exemplary controller is coupled to a modulator 310 and the modulator 310 is coupled to an electromagnetic energy source 312. In several embodiments, the controller 302 and the modulator 310 may be disposed on a downhole sub 200, 106. In several embodiments, the electromagnetic energy source 312 may be disposed on a downhole sub 200, 106. The black body energy source in one or more embodiments includes a broadband electromagnetic energy source that emits substantially white light. In general, the term "white light" refers to broadband light containing a plurality of wavelengths, which appears white to the eye such as light that is generated by a hot blackbody radiator including a hot filament or a hot gas plasma, such as that of a flash lamp.

In several non-limiting embodiments, the downhole fiber optic evaluation system 300 may include a white light interferometer using a broadband source 312. In one or more embodiments, the broadband source 312 includes a tungsten bulb. Incandescent light bulbs have filaments that operate at 3000 K which temperature is far above any borehole temperatures, which are generally below 220 C, so incandescent lights operate without problems at borehole temperatures. That is one reason why an incandescent light has a distinct advantage over a conventional semiconductor light source such as a laser diode (except perhaps a wide band gap, short-wavelength light emitting diodes or lasers), which will dim with increasing temperature and may stop lasing completely at high borehole temperatures. It is also one reason why a white light interferometer based fiber sensor is particularly well suited for downhole use. Several exemplary embodiments may include the use of white light interferometry where the optical path length difference of a fiber optic sensor is shorter than the coherence length (10-20 microns) of white light emitted from a tungsten bulb. The electromagnetic energy source 312 emits light to one or more optical fibers 314. The optical fibers 314 in the non-limiting example of FIG. 3 are shown coupled to an optical coupler 316. The optical coupler 316 may be a fused N×M coupler that includes N input fibers 318 with each of the input fibers being coupled to M output fibers 320. The fibers 318, 320 may be configured for single mode or multimode operation depending on the system application desired.

The exemplary fiber optic sensing system 300 illustrates a Fabry-Perot arrangement. Fabry-Perot interferometers, as in the example shown, may operate using a single optical fiber. In several embodiments, the fiber optic sensing system 300 may use alternative or additional arrangements including Michelson, Mach-Zehnder and Sagnac interferometer arrangements. Output fibers 320 lead to fiber optic sensors 322. In one or more examples, some or all output fibers 320 may be bundled as an optical fiber bundle 324 with breakout fibers leading to individual fiber optic sensors 322. In several embodiments, the fiber optic sensors may be incorporated in a tool extendable member to extend the fiber optic sensors into the borehole, to contact the borehole wall, and/or for insertion into the formation surrounding the downhole sub. In several exemplary embodiments, the fiber optic sensors may be intrinsic sensors (sensing takes place within the fiber itself), extrinsic sensors (sensing takes place in a region outside of the fiber) or a hybrid sensor, which is a combination of intrinsic and extrinsic sensors.

In several embodiments, the fiber optic sensors 322 may be arranged to provide optical output signals representative of any number of selected downhole characteristics and properties. The output signals may be representative of the selected downhole property, which may be associated with any combination of the carrier assembly, the downhole sub, formation samples received by the downhole sub, downhole fluid in the borehole, downhole fluid in a formation and/or the formation structure. Exemplary optical fiber sensors include, but are not limited to, pressure sensors, temperature sensors, strain sensors, and fiber optic sensors for evaluating an complex permittivity (refractive index or absorption) of a sample. The output signals return through the optical fibers 320. A return photo detector and/or charged-coupled device (CCD) 324 may be used to detect the optical signals from the sensors 322. A source detector 326, which may be a photo detector and/or a CCD, may be used to detect the energy emitted directly from the source 312. The source detector 326 and the return detector 328 each produce output signals that are transmitted to the controller interface 308 using a transmission medium suitable for an output signal of the detectors 326, 328. In one or more embodiments, the transmission medium includes electrical conductors.

Figure 4:
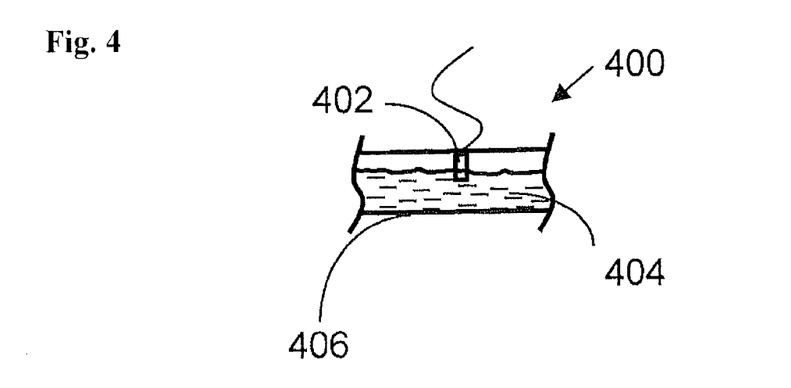
FIG. 4 illustrates a sensor arrangement for estimating properties of a fluid.
Figure 5:
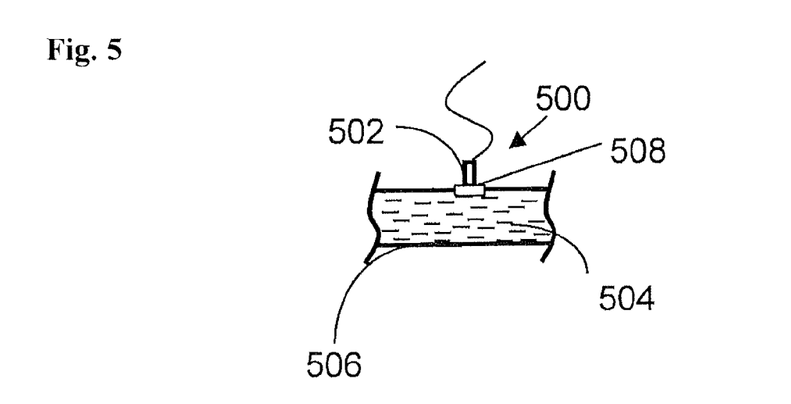
FIG. 5 illustrates another exemplary sensor arrangement for estimating properties of a fluid.

FIGS. 4-5 illustrate several non-limiting examples of downhole fiber optic sensors arranged for exemplary applications according to the disclosure. FIG. 4 illustrates a sensor arrangement 400 for estimating properties of a fluid. Referring to FIG. 3 and FIG. 4 a fiber optic sensor 402 is placed proximate or in contact a fluid 404 within a fluid medium 406. Fluid 404, which may be a downhole fluid or a control fluid, acts on the fiber optic sensor 402. The fiber optic sensor generates an optical output signal representative of a fluid property. Exemplary properties include pressure, temperature, refractive index and electromagnetic characteristics. In several embodiments, the fluid medium may be a fluid cell or flow line within a downhole sub, the medium may be the borehole surrounding a downhole sub, the medium may be the borehole wall mudcake, and/or the medium may be the formation surrounding the downhole sub.

In one or more embodiments, the fluid property is detected by the fiber optic sensor 402. The fiber optic sensor 402 produces an optical signal that is transmitted to a return detector 324. The return detector 324 produces an electrical signal representative of the fluid property that is then transmitted to the controller processor 304. The processor 304 then processes the return detector output signals to estimate the fluid property. One or more embodiments include using the fiber optic sensor to detect the refractive index of the fluid for distinguishing oil from water and to determine fluid components. The sensor 402 may be applied downhole for monitoring fluid sample cleanup in one or more of a wireline arrangement, a slickline arrangement and a MWD arrangement. An array of refractometer sensors may be used in production logging to monitor oil and water flow.

FIG. 5 illustrates another exemplary sensor arrangement 500 for estimating properties of a fluid. Referring to FIGS. 3 and 5, a fiber optic sensor 502 is placed proximate a fluid 504 within a fluid medium 506. Fluid 504, which may be a downhole fluid or a control fluid, acts on the fiber optic sensor 502. In some embodiments, an interface such as a film or other sensitive material may be used as an interface 508. The measurand produces a change in the optical properties of the sensor 502 and this change can be detected as an electrical output signal. Exemplary properties include pressure, temperature, refractive index and electromagnetic characteristics. In several embodiments, the fluid medium may be a fluid cell or flow line within a downhole sub, the medium may be the borehole surrounding a downhole sub, the medium may be the borehole wall mudcake, and/or the medium may be the formation surrounding the downhole sub.

In one or more embodiments, the fluid property is detected by the fiber optic sensor 502. The fiber optic sensor 502 produces an optical signal that is transmitted to a return detector 324. The return detector 324 produces an electrical signal representative of the fluid property that is then transmitted to the controller processor 304. The processor 304 then processes the return detector output signals to estimate the fluid property.

Figure 6:
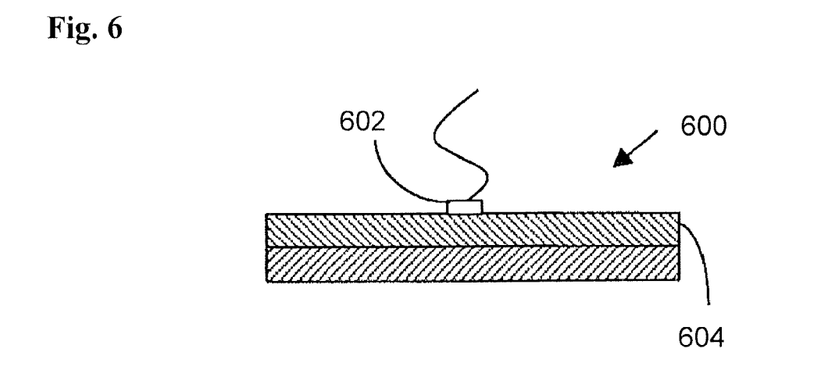
FIG. 6 illustrates a non-limiting example of a contact sensor arrangement for estimating stress and/or strain properties associated with downhole structures.

Referring to FIGS. 3 and 6, a non-limiting example of a contact sensor arrangement 600 for estimating properties associated with downhole structures will be described. The exemplary arrangement 600 includes a fiber optic sensor 602 coupled to a structure substrate 604. The substrate 604 may be a portion of any downhole tool or tool component. In one or more embodiments, stress and/or strain induced into the substrate 604 may be detected by the fiber optic sensor 602. The fiber optic sensor produces an optical signal that is transmitted to a return detector 324. The return detector 324 produces an electrical signal representative of the stress and/or strain that is transmitted to the controller processor 304. The processor 304 then processes the return detector output signals to estimate the stress and/or strain impinging on the substrate 604. The stress/strain transducer 602 may be mounted on any downhole component or tool capable of providing a mounting surface for the transducer 602.

Having thus described aspects of sensor arrangements, further detail regarding components of the sensor(s) is now provided.

Advantageously, the fiber optic sensing system 300 does not require high performance optical sources and may be operated at high temperatures. The optical detection process uses silicon charge-coupled devices (CCD) to measure interference patterns in the reflected signal. In embodiments of sensors 322 making use of Fabry-Perot devices, the Fabry-Perot devices may be fabricated on, for example, silicon wafers. This provides for good control of cavity length in the optical cavity and good uniformity across the wafer. Generally, each of the optical cavities are short (for example, about 10 µm to about 30 µm) and have several advantages. For example, use of a sensor 322 as a temperature sensor can provide for fast (50 ms) response, since a small thermal mass is involved. Such embodiments provide to be highly accurate (within about 0.03° C.).

In evaluation of the fiber optic sensing system 300, the return detector 328 and some of the other components were heated and performance was evaluated. These components were heated to temperatures comparable with temperatures encountered in a borehole 110, from 25° C. to 155° C. Performance of the CCD detector 328 was evaluated using three previously calibrated optical cavities (where each of the optical cavities 801 was held at room temperature). The optical cavities selected were of 15,942 nm, 18,435 nm, and 18,722 nm, respectively. Their length was measured for temperatures ranging from 25° C. to 155° C. Accordingly, measurements were performed to ascertain if apparent error in cavity length readings would be caused by the increase of noise in the CCD array.

Figure 7:
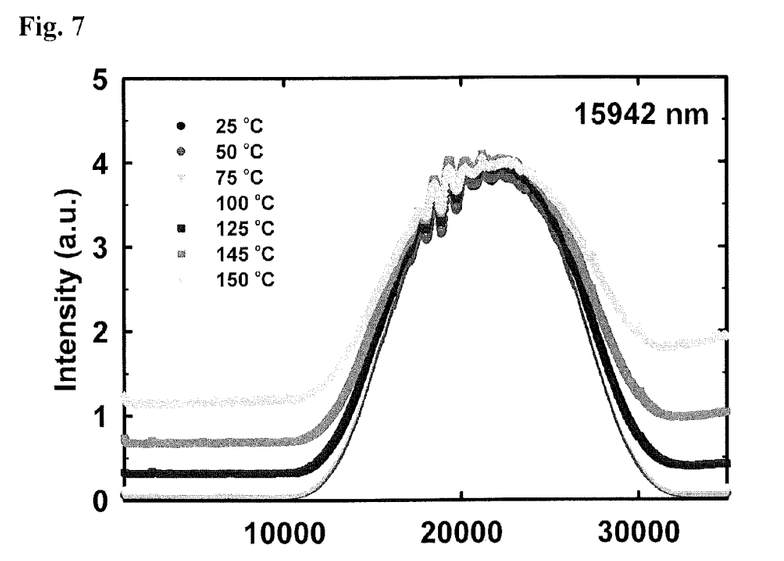
FIG. 7 is a graph depicting data output by a charge-coupled-device (CCD) as function of temperature for an optical cavity (having a length of 15,942 nm)

FIG. 7 shows the CCD signal for several temperatures for the shortest optical cavity 801 selected. The vertical axis is proportional with the light intensity and the horizontal axis is proportional with the number of pixels.

Several important features are observed in FIG. 7. Output of the detector 328 included a signal for each of the pixels in the CCD device, where a correlation between a Fizeau optical wedge interference pattern and an Airy interference pattern was displayed on the CCD detector. Most of the information from the Airy interference pattern is contained in the pixels around the center of the CCD array. As the temperature increases, the background noise (edge pixels on the CCD) increases due to thermal carrier generation in silicon. Thus, the signal to noise data can be temperature corrected and therefore the error in the cavity reading can be reduced. The cavity length information is encoded in the modulation at the top of the bell shape curve. This bell shape is due to the fact that light intensity decreases from the center to the edge of the Airy interference pattern and the visibility of the optical fringes decreases and the fact that the cylindrical lens that spreads the light from the optical fiber gives an optical intensity decreasing from the center of the optical fiber. The fact that the interference fringes are still visible on the plot at 155° C. shows that users should be able to accurately read cavity lengths for a Fabry-Perot optical cavity at borehole temperatures.

Figure 8:
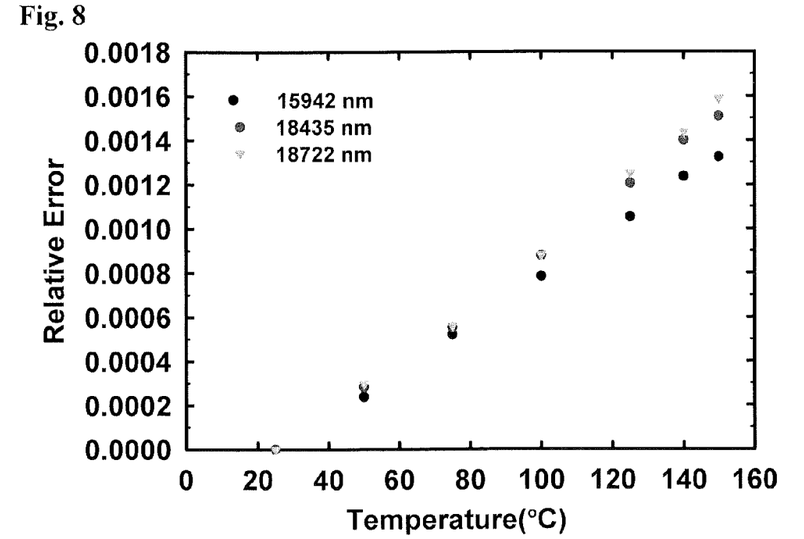
FIG. 8 is a graph providing error plots $[(x-x_{nom})/x_{nom}]$ in cavity readings for three different cavity lengths.

FIG. 8 plots error in the calculated cavity length. This error is derived from the interference pattern as a function of temperature. It can be seen that the error increases with increasing temperature and increasing cavity length. This can be corrected by subtracting the background noise in the CCD array and assuming that the background noise is similar for neighboring pixels. Without temperature correction, the highest error is 1.6E−4. When correcting for the temperature, (e.g., adding a linear correction factor) the error is reduced. The reductions can be seen in FIG. 9.

Figure 9:
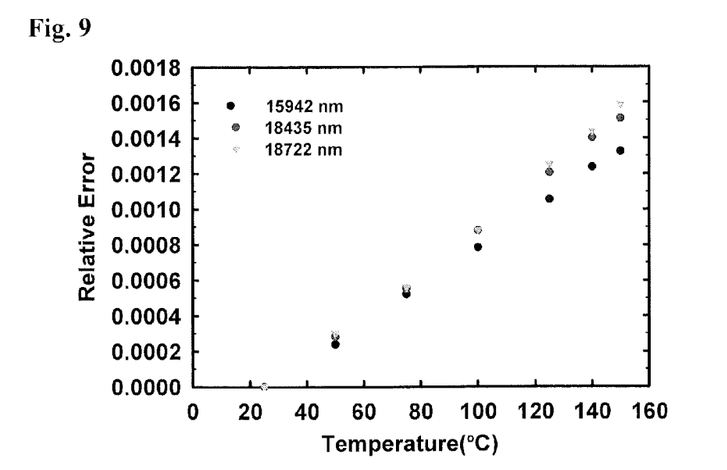
FIG. 9 is a graph providing error plots $[(x-x_{nom})/x_{nom}]$ in the cavity reading for the three cavity lengths.

In FIG. 9, a linear temperature correction factor (0.21 nm/° C.) was used. When a linear correction factor is used, the maximum error in the cavity reading goes down by a factor of four. This error could be further reduced by characterizing the coatings on the CCD pixels and a more careful background noise subtraction.

Figure 10:
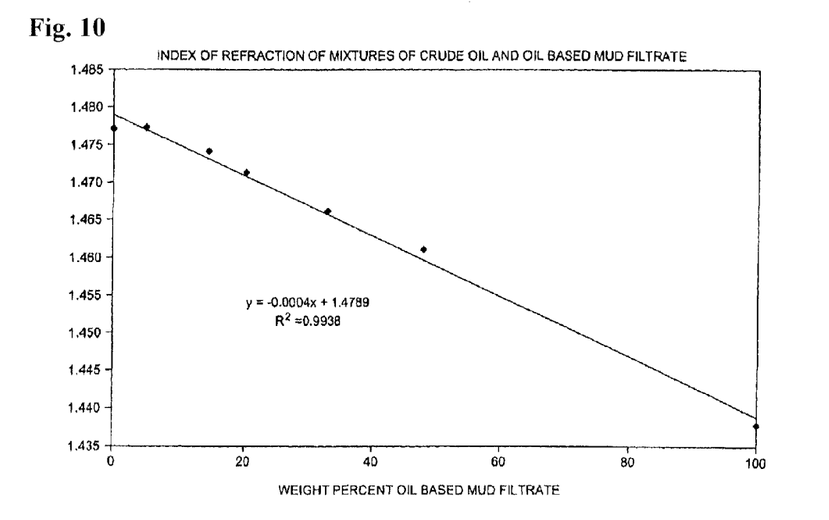
FIG. 10 depicts a change in measured refractive index, n, of a contaminated crude oil with a percentage of oil based mud filtrate contamination.

As discussed above, the white light interferometer may be used for a variety of purposes. For example, a continuum of refractive index readings may be provided, and thus, the continuous refractive readings may be used to monitor more subtle changes in the refractive index such as those associated with sample clean up (where "sample clean up" refers to a transition from filtrate-contaminated formation fluid to nearly pure formation fluid while pumping fluid from selected depths in the wellbore). FIG. 10 illustrates how the refractive index (i.e., index of refraction, n) of a contaminated crude oil can be related to the percentage of oil based mud filtrate contamination. In evaluation of contamination, users may compare, for example, a level of contamination in one sample to the level of contamination in a previously collected sample (e.g., conduct a convergence test), or to a threshold value.

Another use of the white light interferometer includes monitoring sample phase conditions. For example, liquid and gaseous phases may be monitored using the white light interferometer. Liquid hydrocarbon versus liquid water phases may also be monitored by their refractive indices, which are sufficiently different. Combining phase information with other information, such as temperature and pressure information, can provide users with valuable insight into composition of samples.

As the users are provided with valuable information, such as a degree of contamination or phase information, important operational decisions are enabled. For example, once a user is alerted to reduction in contamination below a desired threshold, the user may switch other processes from a "clean-up mode" to a "sampling mode," such as one where formation fluids are then directed into a sample chamber for subsequent topside analysis.

Accordingly, and by way of non-limiting example, at least one sensor of the white light interferometer may be used in conjunction with a sample loading system, such that liquid or gaseous samples may be interrogated by at least one sensor in the downhole environment.

Further adaptations of the fiber optic sensing system 300 may be realized. For example, fiber optic elements as well as sensor elements may be fabricated from materials that are inert or resistant to corrosion in downhole environments.

Additional detail regarding the practice of measuring an optical path difference in a sensing interferometer is provided in U.S. Pat. No. 6,842,254, entitled "System and Method for Measuring an Optical Path Difference in a Sensing Interferometer," which is incorporated herein by reference in its entirety. In this example of a sensing interferometer, light from a source is directed in the sensing interferometer. The light reflected from the sensing interferometer is split into first and second beams respectively directed into two reference interferometers having optical path differences greater than the coherence length of the source and such that the optical signals are in quadrature. The intensities of the light transmitted by the reference interferometers and recombined light reflected from the reference interferometers are detected for measuring the optical path difference in the sensing interferometer. Additional light sources allow for correction of internal perturbations and absolute measurement of the optical path difference in the sensing interferometer The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

What is claimed is:

1. A downhole fiber optic apparatus for acquiring downhole information comprising:
   a carrier conveyable in a borehole;
   a downhole sample tool configured to obtain a sample downhole;
   an electromagnetic energy generator housed in the carrier for conveyance of the electromagnetic energy generator in the borehole;
   a Fabry-Perot interferometer comprising an optical fiber that receives electromagnetic energy emitted from the electromagnetic energy generator and generates an optical output signal representative of the downhole information relating to the sample, the Fabry-Perot interferometer sensing one or more of a pressure, a temperature, a refractive index and a strain, wherein the Fabry-Perot interferometer comprises an optical cavity having an optical cavity length that changes in response to the one or more of the pressure, the temperature, the refractive index and the strain being sensed; and
   a photodetector configured to receive the optical output signal to read the optical cavity length to generate an electrical output signal representative of the downhole information relating to the sample.

2. An apparatus according to claim 1, wherein the carrier is selected from one or more of a downhole sub, a drill string, a wireline and a slickline.

3. An apparatus according to claim 1, wherein the electromagnetic energy generator includes a white light emitter.

4. An apparatus according to claim 3, wherein the white light emitter includes a tungsten bulb.

5. An apparatus according to claim 1, wherein the Fabry-Perot interferometer is selected from one or more of an intrinsic sensor and an extrinsic sensor.

6. An apparatus according to claim 1, wherein the Fabry-Perot interferometer is adapted to acquire information relating to one or more of carrier information, downhole fluid information and formation information.

7. An apparatus according to claim 1, wherein the Fabry-Perot interferometer is configured for evaluating an index of refraction, n, of the sample.

8. A method for acquiring downhole information comprising:
  conveying a carrier in a borehole;
  obtaining a sample downhole;
  emitting electromagnetic energy from an electromagnetic energy generator housed in the carrier for conveyance of the electromagnetic energy generator in the borehole;
  receiving electromagnetic energy emitted from the electromagnetic energy generator with a Fabry-Perot interferometer comprising an optical fiber; and
  generating an optical signal representative of the downhole information relating to the sample using the Fabry-Perot interferometer, the optical signal being representative of one or more of a pressure, a temperature, a refractive index and a strain, wherein the Fabry-Perot interferometer comprises an optical cavity having an optical cavity length that changes in response to the one or more of the pressure, the temperature, the refractive index and the strain being sensed; and
  generating an electrical output signal representative of the downhole information relating to the sample using a photodetector configured to receive the optical signal to read the optical cavity length.

9. A method according to claim 8, wherein conveying the carrier includes conveying using one or more of a downhole sub, a drill string, a wireline and a slickline.

10. A method according to claim 8, wherein emitting electromagnetic energy includes emitting a white light.

11. A method according to claim 10, wherein emitting the white light includes using a tungsten bulb.

12. A method according to claim 8, wherein generating an optical signal further comprises using a Fabry-Perot interferometer selected from one or more of an intrinsic sensor and an extrinsic sensor.

13. A method according to claim 8, wherein generating an optical signal further comprises generating an optical signal representative of information relating to one or more of carrier information, downhole fluid information and formation information.

14. A method according to claim 8, wherein generating an optical signal further comprises generating an optical signal representative of an index of refraction, n, of a sample.

15. A method for evaluating a sample downhole, the method comprising:
  conveying a carrier into a borehole; the carrier comprising an electromagnetic energy generator housed in the carrier for conveyance of the electromagnetic energy generator in the borehole and a Fabry-Perot interferometer comprising an optical fiber that receives electromagnetic energy emitted from the electromagnetic energy generator and generates an optical output signal representative of the downhole information, the optical output signal being representative of one or more of a pressure, a temperature, a refractive index and a strain, wherein the Fabry-Perot interferometer comprises an optical cavity having an optical cavity length that changes in response to the one or more of the pressure, the temperature, the refractive index and the strain being sensed;
  generating an electrical output signal representative of the downhole information relating to the sample using a photodetector configured to receive the optical signal to read the optical cavity length; and
  evaluating the sample obtained downhole with the Fabry-Perot interferometer.

16. The method as in claim 15, wherein the evaluating comprises estimating a level of contamination in the sample.

17. The method as in claim 16, wherein the evaluating further comprises comparing the level of contamination to at least one of a level of contamination in a previous sample and a threshold value.

18. The method as in claim 15, wherein the evaluating comprises collecting phase information.

* * * * *